March 10, 1970  L. WALZEL  3,499,557
CHARGING DEVICE FOR MELTING FURNACES
Filed Aug. 27, 1968  3 Sheets-Sheet 1

Inventor
LEOPOLD WALZEL
By McGlew and Toren
ATTORNEYS

March 10, 1970  L. WALZEL  3,499,557
CHARGING DEVICE FOR MELTING FURNACES
Filed Aug. 27, 1968  3 Sheets-Sheet 2

Inventor
LEOPOLD WALZEL

BY McGlew and Toren
ATTORNEYS

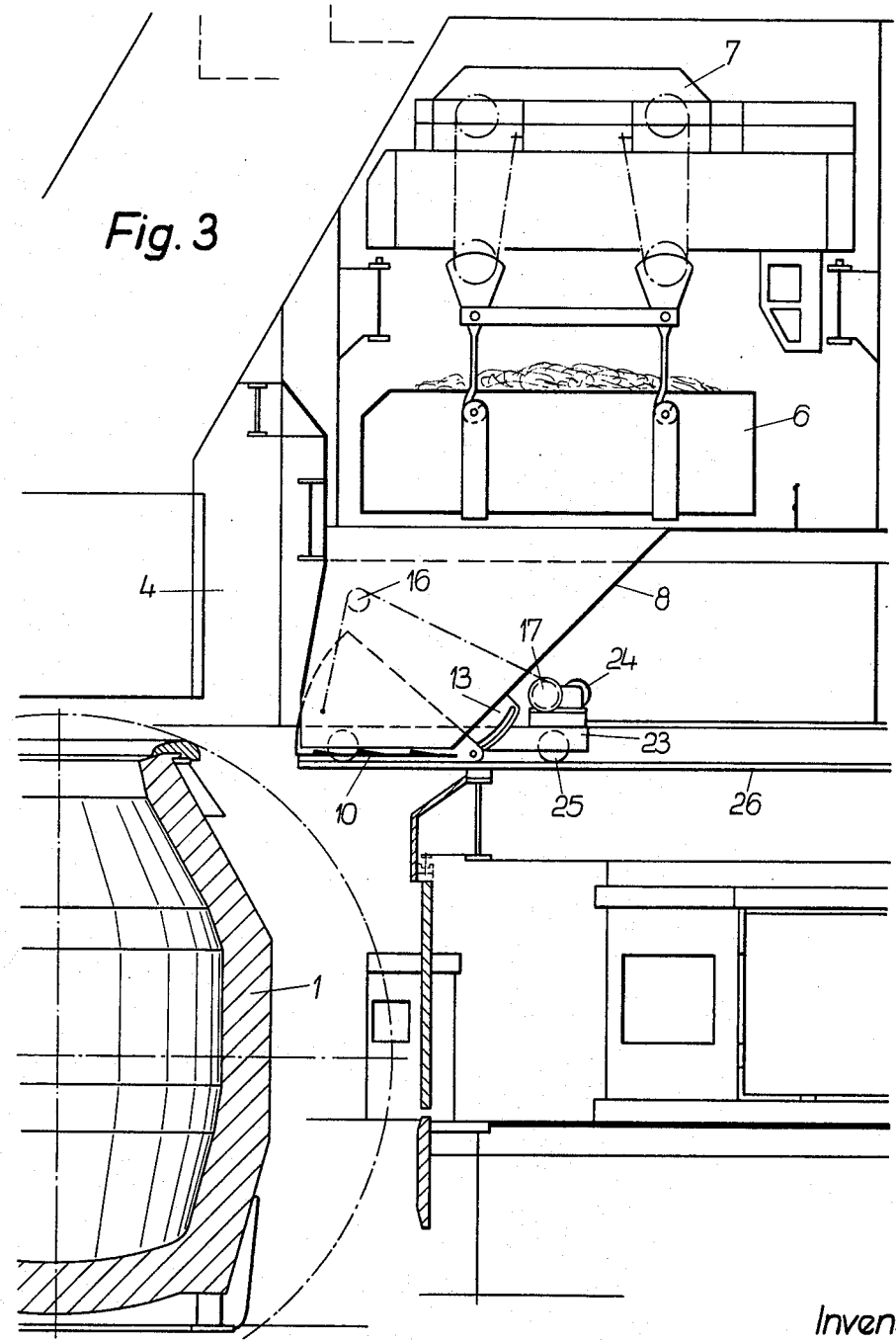

United States Patent Office 3,499,557
Patented Mar. 10, 1970

3,499,557
CHARGING DEVICE FOR MELTING FURNACES
Leopold Walzel, Duisburg, Germany, assignor to
Demag A.G., Duisburg, Germany
Filed Aug. 27, 1968, Ser. No. 755,552
Claims priority, application Germany, Sept. 1, 1967,
1,583,237
Int. Cl. F27d 3/10; F65g 11/20
U.S. Cl. 214—35                     6 Claims

ABSTRACT OF THE DISCLOSURE

A charging device for melting furnaces is comprised of a chute having an outlet opening. A flap is positioned at the opening from the chute and is pivotally movable between a first position closing the opening and a second position permitting charging into the converter furnace. In its second position the pivot axis of the flap is movably positioning while maintaining the flap in a predetermined angular relationship to the horizontal for accommodating the build up of crusts at the opening to the converter furnace.

Summary of the invention

The invention is directed to a device for charging materials into melting furnaces, such as converter furnaces used in steel works, and, more particularly, to a pivotally mounted closure member for an opening in a chute for charging material into the furnace where the closure member is movably positionable to accommodate the build up of deposits at the mouth of the converter furnace.

One of the problems experienced in melting furnaces is the damage caused to the outlet opening from the material charging chute by the mouth of the melting furnace. In melting furnaces, and particularly in converter furnaces used in steel works, the mouth of the furnace is purposefully kept small to avoid heat losses. The small size of its mouth makes it difficult to charge materials into the furnace, especially, scrap material. Though, it would be more advantageous if the mouth of the furnace were cylindrical, particularly for purposes of lining the furnace; however, the frusto-conically shaped mouth is adopted, though a smaller opening results, because it reduces radiant heat losses, affords better flue gas elimination, and provides a better arrangement for the connection to apparatus for the removal of contaminated air.

A notable disadvantage with this type of mouth opening in a converter furnace is the development of deposits or crusts at the furnace mouth. These deposits are the result of a number of different factors. The outlet end of a chute can be readily introduced into the mouth opening of a large furnace having an original diameter of about 2 to 3 meters; however, during operation the diameter of the opening is reduced as build up appears at the mouth. Various types of deposits are built up depending on the formation of gases because of the difference in heat conditions and type of discharge, such as in the LDAC method as compared to LD method. The build up at the mouth of the furnace, that is, the so-called converter crust, varies considerably during operation and, as a result, the furnace mouth has a constantly varying diameter. The converter crust extends from the inner edge of the mouth toward the outside and, as a rule, forms a ring of about a ton weight. Periodically during operation of the furnace, the ring of converter crust is broken off and removed, such as after the furnace has been charged several times. During the interval spanning the crust removal operations, the irregular formation at the mouth of the converter must be taken into consideration when charging material into the furnace.

In the past when a converter furnace is tipped into the charging position, the crust deposited about its mouth has damaged the outlet opening from the charging chute, or has displaced the opening from the chute into a position where it becomes extremely difficult to charge scrap material into the furnace.

When scrap material is being charged into converter furnaces, particularly, where the opening to the furnace has been narrowed by the build up of crust, considerable difficulties have been experienced in the charging operation, especially where bulky scrap is involved. Any blockage of the chute hinders the charging of the material into the furnace and the blockage may be caused by jamming, interlocking, and the like. To assure an adequate supply of the scrap from the scrap trough through the chute into the furnace, it is necessary that the chute be located in the loading or charging position without being damaged or displaced due to the crust build up at the opening of the converter furnace. This problem is aggravated particularly by the increasingly larger amounts of scrap material which must be fed through chutes and the like into the furnaces presently in use. As an example, in converter furnaces having an effective capacity of 200 to 300 tons, it is necessary to charge 50 cubic meters of the scrap during each cycle of operation. If the blockages in the charging chute are not avoided, they can seriously affect the working efficiency and operation of the furnace.

Accordingly, the primary object of the present invention is to provide a device for charging materials into a converter furnace and the like, which avoids damage to the outlet opening from the chute and adjusts the position of the outlet opening from the chute in accordance with the build up of deposits at the mouth of the furnace.

Another object of the invention is to provide a flap which is pivotally positionable between a closed position and an opened or charging position at the outlet opening from the chute.

Still another object of the invention is to support the pivot axis of the flap so that it is movable and yet the flap retains a predetermined angular relationship to the charging position of the furnace while it adapts to the building up of deposits at the mouth of the furnace.

Moreover, another object of the invention is to provide a movably positionable support member for the flap so that it can be moved away from the outlet end of the chute when it is not in use.

Therefore, in accordance with the present invention, a closure flap is pivotally mounted at the outlet opening from a chute used for charging scrap material into a furnace. In addition to being pivotally mounted, the flap is arranged to assume a predetermined angular relationship in the charging position and to be movably displaceable while retaining its angular relationship for accommodating any build up of deposit at the mouth of the furnace. Because the disclosure flap is movably supported at the outlet opening from the chute, it is possible to avoid damage when the converter furnace is moved into its charging position. In this arrangement in moving the converter furnace into position for receiving scrap materials, it contacts the closure flap, the flap will be displaced without being damaged and it will still be in proper position for loading the furnace. As the amount of crust about the mouth of the furnace continues to build up, the position of the closure flap continues to be adjusted, though maintaining the same predetermined charging angle. Due to the manner in which the flap is supported, it is easily adjusted for adapting to the conditions at the mouth of the furnace. As the converter furnace or vessel is tipped or moved into the charging position, the closure flap will reach the open position only under certain circumstances and, accordingly, the scrap will be released from the chute only when the proper charging position of the vessel is reached.

Another feature of the invention is the arrangement for moving the closure flap between its closed and its opened positions. This is accomplished by securing a lifting means, such as a cable, to the flap at a position permitting its movement about a pivot axis, and securing the other end of the cable to a winch or drum which is supported on the chute or other support arrangement so that it does not follow the pivotal movement of the flap. Since the flap is pivotally positionable between its opened and closed positions, it is possible to avoid damaging the lifting arrangement when the converter cannot be properly moved into the charging position. Moreover, the apparatus for moving the flap can be arranged to close the flap in the event the material cannot be charged properly into the converter furnace. Because of this apparatus for pivotally positioning the flap an additional safety feature is afforded which prevents both damage to the equipment and premature or partial opening of the chute.

In accordance with another embodiment of the invention, it is possible to support the closing flap and its lifting apparatus on a rolling support, such as a car mounted on a track way. When necessary the closure flap can be moved along the track way away from the opening in the chute. Under certain circumstances, it may be desirable to effect the rapid discharge of scrap from a chute which is blocked by partly displacing the closure flap by means of the rolling support. By means of this arrangement, the flap can be positioned horizontally as well as in an inclined path. With this arrangement a slight movement of the rolling device along the track often is sufficient to effect the loosening of any blockage in the chute.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Brief description of the drawings

In the drawings:

FIG. 3 is a view similar to FIG. 1, however, showing an alternate embodiment of the support for the closure flap of the charging apparatus.

Detailed description of the preferred embodiments

Figure 1:
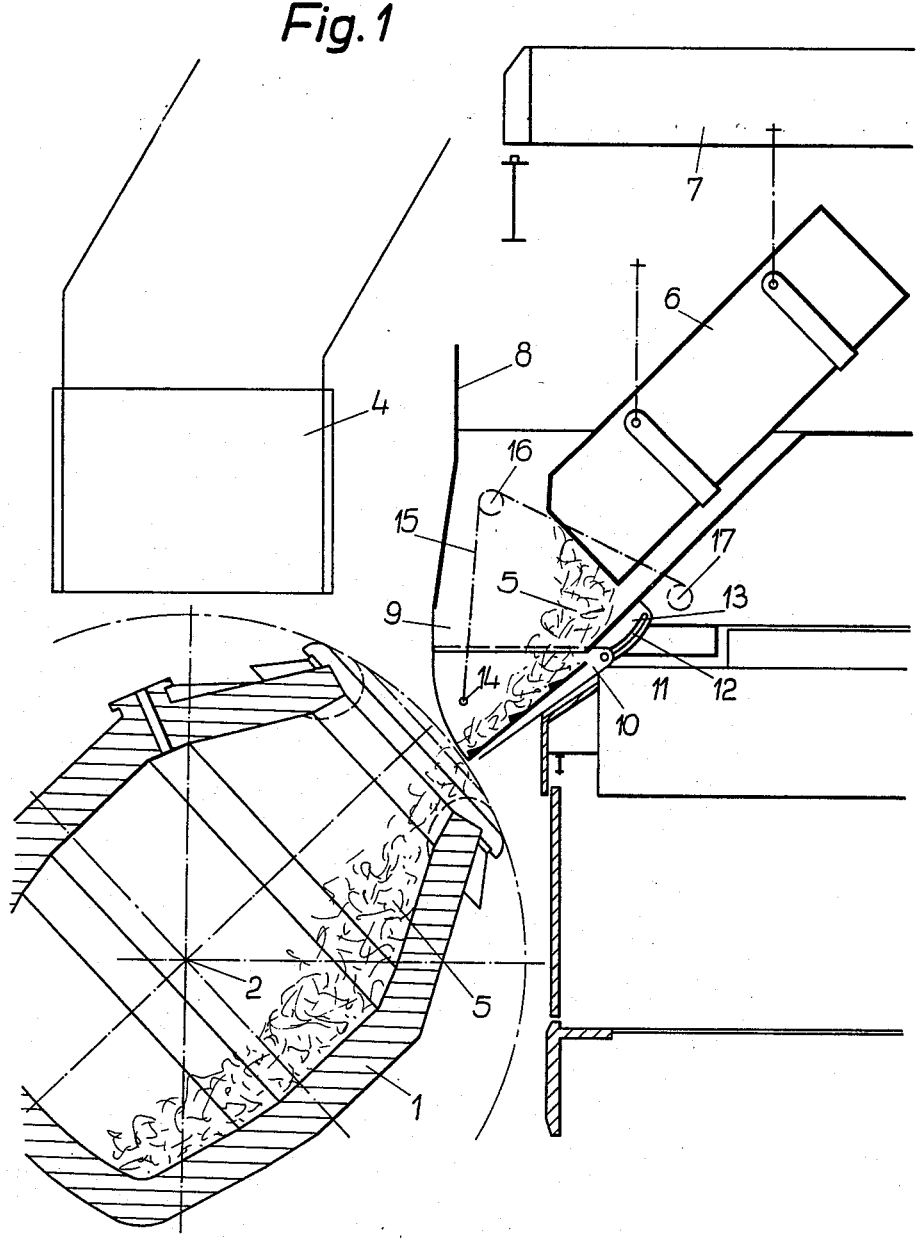
FIG. 1 is a somewhat schematic, vertical view, partly in section, of a converter furnace employed in a steel works illustrating a charging apparatus embodying the present invention.

In FIG. 1 the converter furnace or vessel 1 is shown tipped about a pivot axis 2 into an inclined charging position disposed along the axis 3. Disposed above the converter is an exhaust chimney 4. Scrap material 3 is shown being introduced into the converter from a scrap trough 6 suspended from a trolley member 7 and passing through a chute 8. The outlet end 9 of the chute 8 has a closure flap 10 which is pivotally mounted on a pin member or members 11 which form the pivot axis for the flap. Secured to the chute is a side member 13 containing a guideway or slot 12 into which the pin member 11 is movably positioned, that is, the pin member is arranged to slide through the slot 12. Attached to the flap 10 at the point 14 is a lifting cable 15 which passes upwardly over a guide pulley 16 and is connected at its opposite end to a drum 17 such as in a winch or the like, and is employed for moving the flap between its opened and closed positions.

Figure 2:
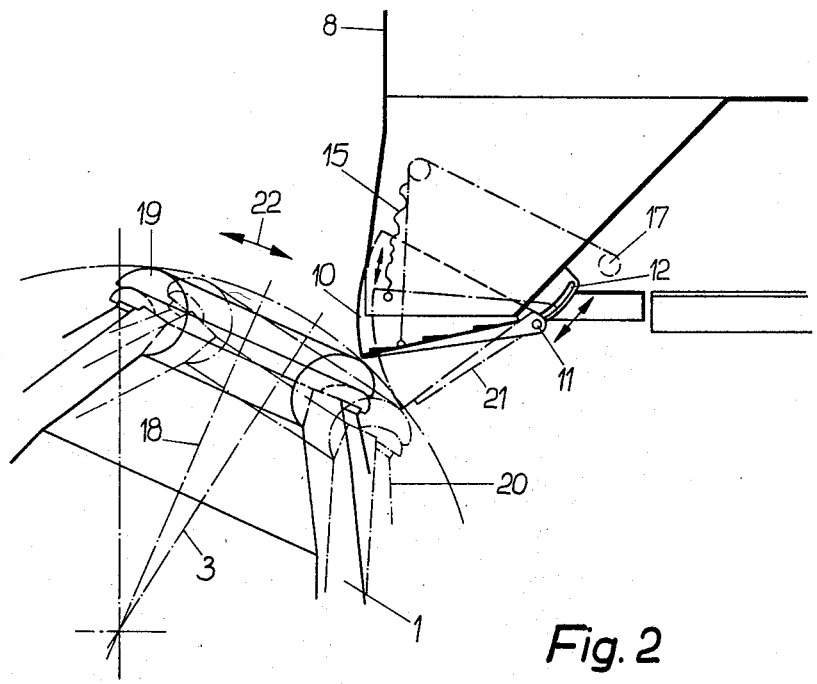
FIG. 2 is a partial view similar to FIG. 1 showing various positions of the converter furnace and the charging apparatus.

In FIG. 2, the converter furnace 1 is shown in full lines in a position spaced from the charging position and having an axis 18. When the converter is in this position, the closure flap 10 cannot reach its open position indicated by the dash-dot line 21. As shown there is a deposit or crust 19 formed at the mouth of the vessel which contacts the edge of the flap. Until the flap can be located in its proper open position, the scrap trough 6 as shown in FIG. 1 is not moved into the discharging position for dumping the scrap material into the chute 8. Only when the converter vessel has reached the position indicated by the dot-dash lines 20 and the flap is in the position indicated by the dot-dash lines 21 is the scrap trough moved into the unloading position for delivering the material into the chute.

As can be noted in FIG. 2, when the converter is in the position indicated by the lines 20 it is located about the axis 3 and is in proper charging position. As the converter vessel is moved into the charging position, if a crust has built up about its mouth, as shown in the drawing, it causes the closure flap to be displaced by means of the pin member 11 through the slot 12 and thereby avoids any damage to the flap which otherwise might occur if the flap could not be adjustably positioned. Due to the manner in which the closure flap is supported, the converter vessel 1 may be moved in the direction of the arrows 22 without any difficulties developing. Since the closure flap is displaceable while maintaining its predetermined charging angle the converter vessel may be moved in any desired direction without damaging or improperly positioning the closure flap. As the converter vessel is moved the lifting cable can be wound about the drum 17 and relieved of any stress. In the closure position of the closure flap the lifting cable is not exposed to damage in any way. Further, the safety effect of the flap at the opening in the chute prevents any scrap from being discharged until the converter furnace is in the proper charging position.

In FIG. 3, the closure flap 10 is mounted on a car or rolling support member 23 which is in turn arranged to roll or slide along a horizontal track 26. The side member 13 is attached to the support member 23 and in turn the pin members 11 are secured in the slot 12 in the side member for attachment to the support member. Further, the winding drum 17 and the guide pulley 16 are mounted on the support member along with a drive means 24 for the drum. In this arrangement the lifting apparatus as well as the closure flap 10 are secured to the car member so they can be operated as a unit. A drive device 25 is provided on the support member for moving it along the track 26.

As indicated previously, the car 23 and the lifting apparatus can be operated to effect movement for loosening blockages in the chute delivering scrap material into the converter furnace.

It will be readily appreciated from the embodiments described and illustrated, that various designs of the charging apparatus can be effected. For example, the lifting apparatus for the closure flap can be provided on one or both sides of the chute in a position which does not interfere with the charging operation. The guideway or slot 12 in the side member 13 can be shaped as required to afford the desired angular position of the closure flap. Moreover, the horizontal track 26 for the rolling support member 23 may be inclined to the horizontal with a retaining device being used for the end position of the support member 23.

What is claimed is:

1. A device for charging material into a melting furnace, such as a converter furnace, comprising walls forming a chute having an opening and adapted to charge material from the opening into the converter furnace, a flap being located adjacent the opening in said chute.

said flap movably positionable between a first position closing the opening and a second position having a predetermined angular relationship for permitting the discharge of material from the opening, means having a pivot axis for pivotally positioning said flap at the opening from said chute, and means for movably positioning the pivot axis of said means for pivotally positioning said flap whereby said flap is movably displaceable in its second position while maintaining its predetermined angular relationship.

2. A device, as set forth in claim 1, wherein means being secured to said flap for moving said flap between its first and second positions.

3. A device, as set forth in claim 2, wherein said means for moving said flap comprises a hoisting member, a lifting cable secured at one end to said flap and at its other end to said hoisting member, and a pulley for guiding said lifting cable located between said hoisting member and said flap.

4. A device, as set forth in claim 1, wherein said means for pivotally securing said flap to said chute comprises at least one pin member secured within said walls of said chute and fitted into said flap for pivoting said flap between its first and second positions.

5. A device, as set forth in claim 4, wherein said means for movably positioning the pivot axis comprises a side member secured to said chute at the location of the pivot axis of said flap, said side member having a slot formed therein and said slot extending in the general direction of said flap in its second position, and said pin member being fitted within said slot in sliding relationship whereby the pivot axis is displaceable within said slot for accommodating the movement of said flap in response to obstructions formed on the mouth of the converter furnace for retaining the predetermined angular relationship of said flap in its second position.

6. A device, as set forth in claim 1, and comprising a support member being adapted to be rollably positionable on a trackway, a side member secured to said support member and having a slot formed therein extending in the general direction of said flap in its second position, said means for pivotally positioning said flap comprising a pin member being movably positioned in said slot in said side member and being affixed to said flap for pivoting said flap between its first and second position, and means for moving said flap between its first and second positions being mounted on said support member whereby said support member is displaceable between a position which said flap located at the opening in said chute and another position with said flap displaced in the direction of movement of said support member from the opening in said chute.

References Cited

UNITED STATES PATENTS

| | | | |
|---|---|---|---|
| 2,713,408 | 7/1955 | Tench | 193—3 XR |
| 3,233,757 | 2/1966 | Long | 214—35 |

ROBERT G. SHERIDAN, Primary Examiner

U.S. Cl. X.R.

193—21; 222—556